United States Patent [19]

Hayashi et al.

[11] Patent Number: 5,085,006
[45] Date of Patent: Feb. 4, 1992

[54] WEATHER STRIP FOR MOTOR VEHICLE

[75] Inventors: Keizo Hayashi, Nagoya; Kiyoshi Shigeki, Fukuroi; Kazuo Ogawa, Inazawa, all of Japan

[73] Assignee: Toyoda Gosei Co., Ltd., Nishikasugai, Japan

[21] Appl. No.: 655,187

[22] Filed: Feb. 13, 1991

Related U.S. Application Data

[63] Continuation of Ser. No. 467,546, Jan. 19, 1990, abandoned.

[30] Foreign Application Priority Data

| Apr. 24, 1989 | [JP] | Japan | 1-47969[U] |
| Aug. 17, 1989 | [JP] | Japan | 1-96255[U] |
| Aug. 17, 1989 | [JP] | Japan | 1-96256[U] |

[51] Int. Cl.$^5$ .................................................. E06B 7/16
[52] U.S. Cl. .......................................... 49/482; 49/490
[58] Field of Search ............... 49/482, 485, 490, 491, 49/496, 497

[56] References Cited

U.S. PATENT DOCUMENTS

| 2,823,430 | 2/1958 | Morton | 49/482 |
| 2,954,592 | 10/1960 | Parsons | 49/482 |
| 3,167,825 | 2/1965 | Zoller | |
| 3,167,856 | 2/1965 | Zoller | |
| 4,374,880 | 2/1983 | Mesnel | |
| 4,695,499 | 9/1987 | Whitener | 49/490 X |
| 4,744,570 | 5/1988 | Kranz | 49/490 X |
| 4,769,950 | 9/1988 | Ogawa et al. | 49/490 |
| 4,848,035 | 7/1989 | Sakuma et al. | 49/491 |
| 4,869,945 | 9/1989 | Harney | 49/490 X |
| 4,918,867 | 4/1990 | Hayashi et al. | 49/491 X |
| 4,959,081 | 9/1990 | Mathellier | 49/491 X |

FOREIGN PATENT DOCUMENTS

| 59-167348 | 9/1959 | Japan . | |
| 2140067 | 11/1984 | United Kingdom | 49/490 |
| 2193242 | 2/1988 | United Kingdom | 49/490 |

*Primary Examiner*—Gary L. Smith
*Assistant Examiner*—Jerry Redman
*Attorney, Agent, or Firm*—Cushman, Darby & Cushman

[57] ABSTRACT

A weather strip to be attached to a flange formed along a door opening or a door frame of a motor vehicle, having a trim portion, a sealing portion formed on an outer surface of the trim portion, and two flange retaining lips projecting from each of opposed inner surfaces of the trim portion inwardly for holding the flange. A notch is defined longitudinally in a root portion of one flange retaining lip projecting from adjacent and open end of one of the opposed inner surfaces, which is on the opposite side of the trim portion from the sealing portion. When the weather strip is attached to a thicker flange, the one flange retaining lip is ripped off along the notch.

7 Claims, 6 Drawing Sheets

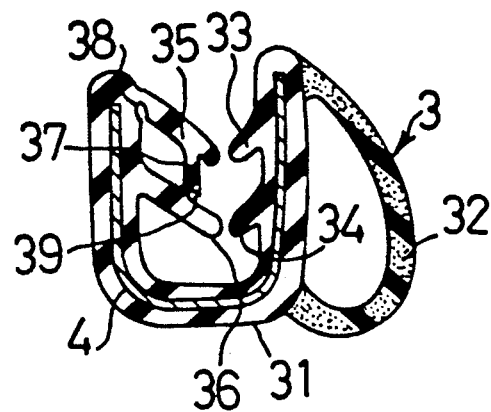
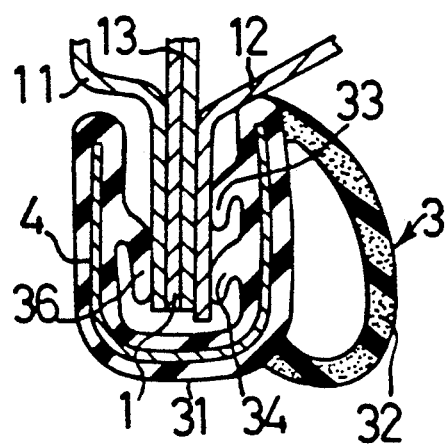
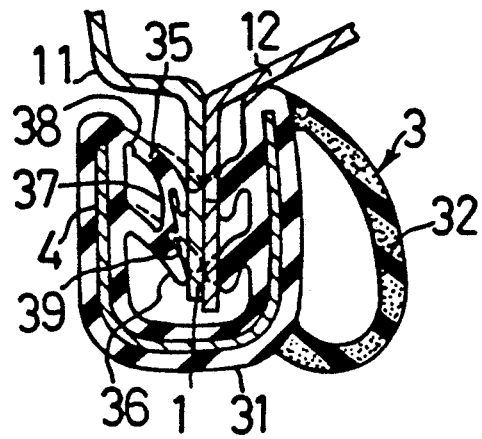

WEATHER STRIP FOR MOTOR VEHICLE

This is a continuation of Ser. No. 07/467,546 filed Jan. 19, 1990, and now abandoned.

BACKGROUND OF THE INVENTION

1. Field of the Invention

The present invention relates to a weather strip to be attached along a door opening or a door frame of a motor vehicle.

2. Description of the Prior Art

FIGS. 13 and 14 illustrates cross-sections of the conventional weather strips 3, each being attached along a door opening of a vehicle body. Each of the weather strips 3 is formed by extrusion, and is provided with a trim portion 32 formed on its side surface. Flange retaining lips 33, 34, 35 and 36 are formed on inner opposed side surface of the trim portion 31. When each weather strip 3 is attached to a flange 1 projecting along the door opening, the flange 1 is forcibly inserted between the retaining lips 33, 34, and 35, 36 and retained thereby.

There are cases where the thickness of the flange to which the weather strip is attached varies locally in view of the structural strength of the vehicle body. For instance, the flange 1 is composed of two body panels in FIG. 13, and two body panels and one reinforcing plate in FIG. 14 (Japanese unexamined patent publication No. Sho 59-167348). In such a case, when the flange retention force of the flange retaining lips is set so as to fit for a thinner flange, a thicker flange is difficult to insert between the retaining lips. On the other hand, when the flange retention force is set so as to fit the thicker flange, the flange retention force is insufficient for the thinner flange.

SUMMARY OF THE INVENTION

It is an object of the present invention to provide a weather strip which can be attached to both a thicker flange and a thinner flange, or a flange having locally different thicknesses with good work efficiency and good flange retaining properties.

The present invention provides a weather strip composed of a U-shaped trim portion and a sealing portion formed on an outer surface of the trim portion. At least one flange retaining lip projects from one of the opposed inner side surfaces of the trim portion while at least two flange retaining lips project from the other inner side surface of the trim portion. A root portion of one of the at least two flange retaining lips which project from an open end of the trim portion is formed thin enough to be ripped off.

The thin root portion is obtained, for example, by longitudinally forming a notch in the root portion when the weather strip is extended. The notch is formed in an inner side of the root portion of the flange retaining lip, facing a top wall of the trim portion.

The present invention further provides a weather strip having a flange retaining lip of which a root portion is formed thin enough to be ripped off, and a bridge connecting the rippable flange retaining lip and its adjacent flange retaining lip, and having a rippable thin portion at its connecting end to the adjacent flange retaining lip.

When the weather strip provided with a rippable flange retaining lip is attached to a thicker flange, the rippable flange retaining lip is entirely ripped off along the thin root portion. When such a weather strip is attached to a flange of locally different thicknesses, the rippable retaining lip corresponding to the thicker flange portion is ripped off along the thin root portion.

When the weather strip provided with both a rippable flange retaining lip and a rippable bridge, is attached to a thicker flange, both the rippable flange retaining lip and the rippable bridge are entirely ripped off along the respective thin portions. When such a weather strip is attached to a flange of locally different thicknesses, both the rippable flange retaining lip and rippable bridge corresponding to the thicker flange portion are ripped off along the respective thin portions.

BRIEF DESCRIPTION OF THE DRAWINGS

FIG. 9 is a cross-sectional view of the weather strip;

FIGS. 10 and 11 are cross-sectional views of weather strips, each being attached to a flange;

DETAILED DESCRIPTION OF THE EMBODIMENTS

Figure 1:
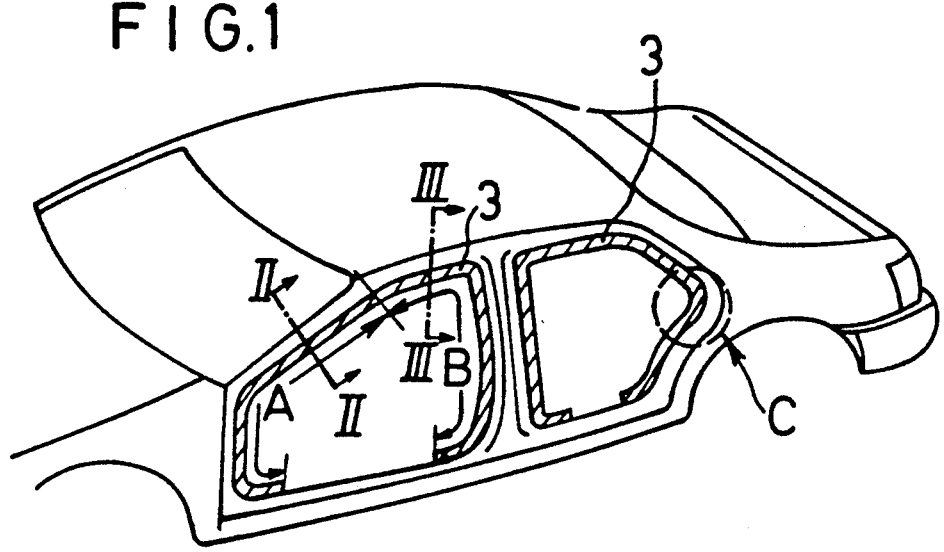
FIG. 1 is a perspective view of a motor vehicle to which a weather strip according to the present invention is attached.

FIGS. 1 through 4 illustrate a first embodiment of a weather strip according to the present invention. As shown in FIG. 1, weather strips 3 are attached along the front and rear door openings of a body of a motor vehicle. Each weather strip 3 is attached to a flange 1 surrounding the door opening.

Figure 2:
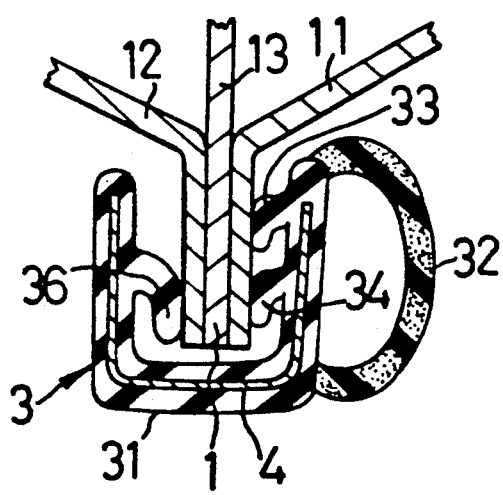
FIG. 2 is a cross-sectional view taken along the line II—II of FIG. 1.
Figure 3:
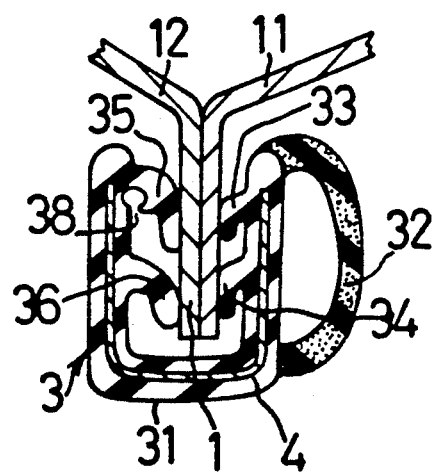
FIG. 3 is a cross-sectional view taken along the line III—III of FIG. 1.

In the region A of a front door opening shown in FIG. 1, the flange 1 is formed by jointing edges of an outer panel 11 and an inner panel 12 through a reinforcing plate 13, as shown in FIG. 2 while in the other region B, the flange 1 is formed by jointing edges of the outer panel 11 and the inner panel 12 as shown in FIG. 3.

As shown in FIG. 3, the weather strip 3 is composed of a trim portion 31 having a U-shaped cross-section, and a sealing portion 32 formed on an outer side surface of the trim portion 31, which is on the outside of a motor vehicle when the weather strip 3 is attached to the motor vehicle. The sealing portion 32 is compressed by a peripheral edge of a door.

Flange retaining lips 33, 34 and 35, 36, respectively project from opposed inner side surfaces of the trim portion 31. Metal core 4 is embedded within the trim portion 31. The flange retaining lip 35 projecting from one of opposed end portion of the trim portion, which is on the inside of a motor vehicle when the weather strip 3 is attached to the motor vehicle, is provided with a longitudinally extending notch 38 in an inner side of a root portion thereof.

The weather strip 3 may be formed from a wide variety of rubber, thermoplastic resin or thermoplastic elastomer, for example, including EPDM rubber by extrusion. The notch 38 is also formed during the extrusion process.

Figure 4:
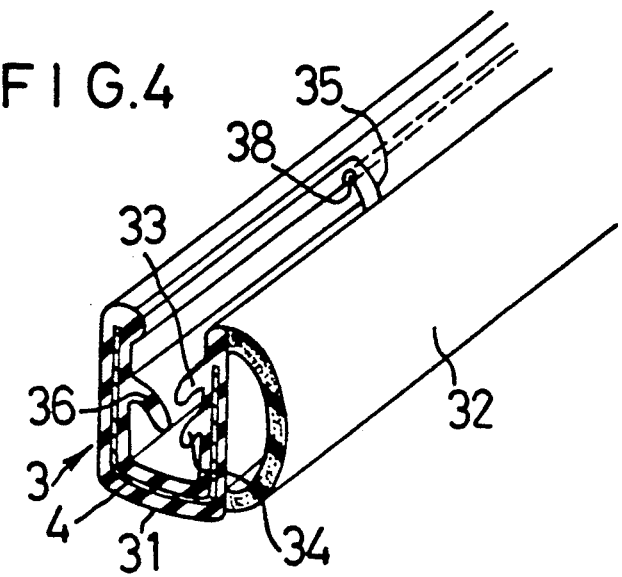
FIG. 4 is a perspective view of the weather strip from which a rippable flange retaining lip is locally ripped off.

In order to attach the weather strip 3 having the above-described structure along a front door opening of a motor vehicle as shown in FIG. 1, the flange retaining lip 35 is ripped off along the notch 38 by the length corresponding to the region A where the flange 1 is composed of edges of two door panels and one reinforcing plate as shown in FIG. 2, and an end of the ripped lip is cut off as shown in FIG. 4. The thickness of the root portion of the flange retaining lip 35 may vary, but is preferably between about 1 and about 1.5 mm. By forming the notch 38 of about 0.5 mm, the flange retaining lip 35 can be easily ripped off by hand along the root portion thereof.

The flange retaining lips 33, 34, 35 and 36 of the weather strip 3 are formed so as to have a flange insertion load and a flange retention force fit for the flange composed of edges of two door panels. In the flange portion where edges of three panels or plates are bejointed, the flange retaining lip 35 is ripped off so as not to increase the flange insertion load. In this case, the pressing force of the flange retaining lips 34 and 36 on the flange 1 is increased due to the increasing in thickness of the flange by the reinforcing plate 13 so as not to decrease the flange retention force.

FIGS. 5 through 8 illustrate a second embodiment of the present invention. The explanation of the structure which is identical to that of the first embodiment will be omitted.

The weather strip of the second embodiment is characterized in that the rippable flange retaining lips exhibit a flange extraction load larger than that of the rippable weather strip of the first embodiment. The flange retaining lip 35 formed near an open end of the trim portion 31 is made slightly thicker than the other flange retaining lips and is provided with a notch 38 having a throttled opening in an inner surface of a root portion thereof. Opposed edges defining the opening of the notch 38 are in contact with each other to close the opening of the notch 38.

The weather strip 3 having the above-described notch 38 is produced as follows, for example. Solid rubber composing the trim portion 31 and sponge rubber composing the sealing portion 32 are integrally extruded together with the metal core 4 as shown by the solid lines in FIG. 8. The retaining lip 35 extends outwardly of the flat trim portion 31, and the notch 38 formed in the root portion of the retaining lip 35 opens inwardly. Then, the flat trim portion 31 is bent into a U-shaped cross section as shown by the broken lines in FIG. 8.

Figure 6:
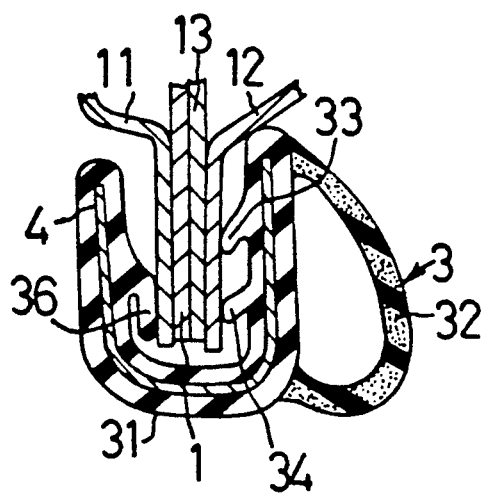
FIG. 6 is a cross-sectional view of the weather strip attached to a thicker flange.
Figure 7:
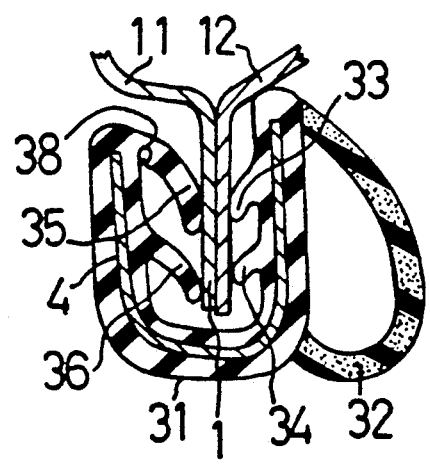
FIG. 7 is a cross-sectional view of the weather strip attached to a thinner flange.
Figure 8:
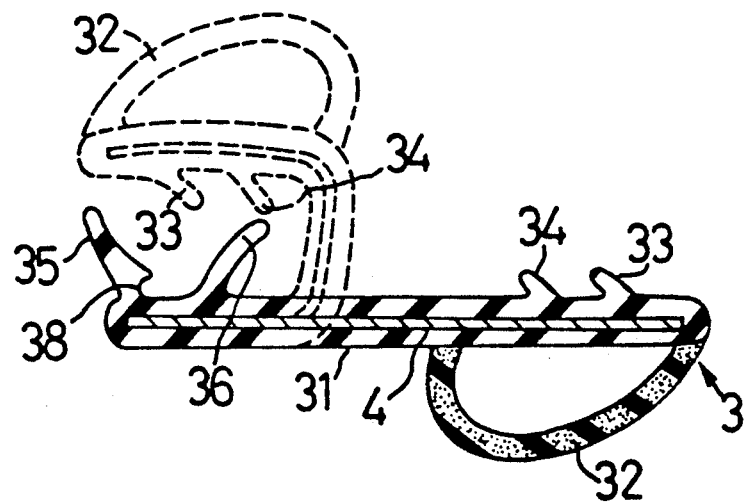
FIG. 8 is a view showing the producing processes of the weather strip.

The weather strip 3 having the above-described construction is attached to a flange surrounding each of the front and rear door openings of a motor vehicle. In region A; the opening is composed of edges of two body panels 11, 12, and two reinforcing plates 13 as shown in FIG. 6, and in the region B, the flange 1 is composed of edges of two body panels 11, 12 as shown in FIG. 7. A flange along a rear door opening is composed of edges of two body panels over the entire length thereof.

Figure 5:
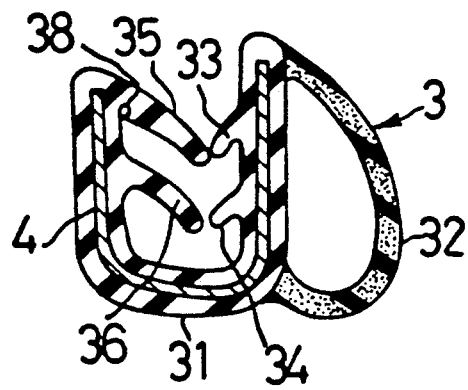
FIG. 5 is a cross-sectional view of the weather strip before it is attached to a flange.

Before the weather strip 3 is attached to the flange surrounding the front door opening, the weather strip 3 is cut to a predetermined length, and then, the flange retaining lip 35 corresponding to the region A of FIG. 1 is ripped off along the notch 38. Unripped retaining lip 35 is inwardly bent and brought into engagement with the opposite retaining lip 33 as shown in FIG. 5. This results in the opening of the notch being closed. FIG. 6 illustrates the attached state of the weather strip in the region A, and FIG. 7 illustrates the attached state of the weather strip in the region B. In the rear door opening, the weather strip 3 is attached in the same state as that of FIG. 7.

In the region A where the Flange is composed of edges of two doors panels and two reinforcing plates, the flange 1 can be inserted without difficulty since the retaining lip 35 is ripped off. The flange extraction load of the weather strip can be kept high since the flange is thick in the region A.

In the region B and the rear door opening where the flange 1 is respectively composed of edges of two body panels, the flange retaining lip 35 of the attached weather strip remains. The root portion of the retaining lip 35, provided with the notch 38 is thin enough to be ripped off.

However, when the flange 1 is forcibly inserted between the flange retaining lips, edges defining the opening of the notch 38 are in pressure contact with each other, applying a resistance power against the inwardly direction deformation of the retaining lip 35. This results in the retaining lip 35 being strongly pressed against the flange 1, and accordingly a sufficiently large flange extraction load being obtained regardless of the provision of the notch 38.

Figure 15:
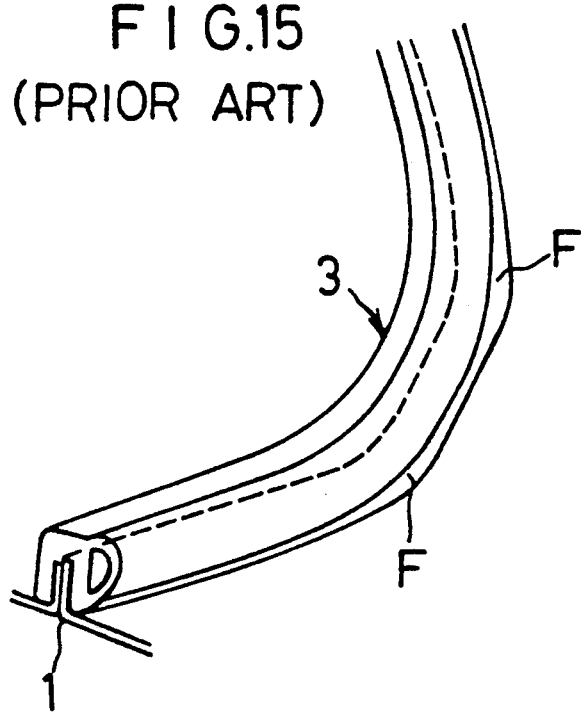
FIG. 15 is a view illustrating the deformation of the conventional weather strip attached to a corner portion.

Generally, the weather strip is attached to the flange by pushing the weather strip on the flange from one end to the other end thereof while applying tension to the weather strip in its longitudinal direction. However, when the weather strip is attached to a corner portion, especially the corner portion of locally different curvatures, the attached weather strip tends to slip out of the flange. For example, FIG. 15 illustrates the attached state of the weather strip 3 in a corner portion C of a rear door opening in FIG. 1. In such a corner portion, slips of the attached weather slip 3 tend to occur in the region of large curvatures F.

Ordinarily, these slips of the weather strip 3 can be prevented by increasing the thickness of the retaining lip so as to increase the flange extraction load. However, even if the thickness is increased, the flange extraction load of the retaining lip having an opened notch cannot be increased.

In accordance with the present embodiment, the flange retaining lip 35 exhibits substantially the same flange extraction load as that of the other flange retaining lips regardless of the provision of the notch 38. Therefore, the weather strip of the present embodiment can be attached to the flange without any slip in corner portions.

FIGS. 9 through 12 illustrate a third embodiment of the present invention.

Figure 12:
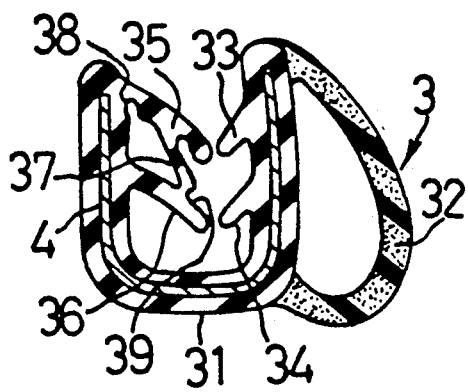
FIG. 12 is a cross-sectional view of a modification of the weather strip illustrated in FIG. 9.
Figure 13:
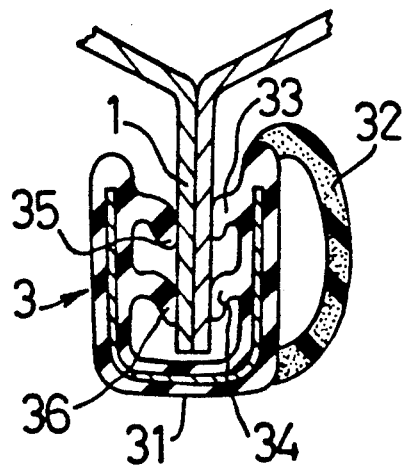
FIGS. 13 and 14 are cross-sectional view of the conventional weather strips, each being attached to a flange.
Figure 14:
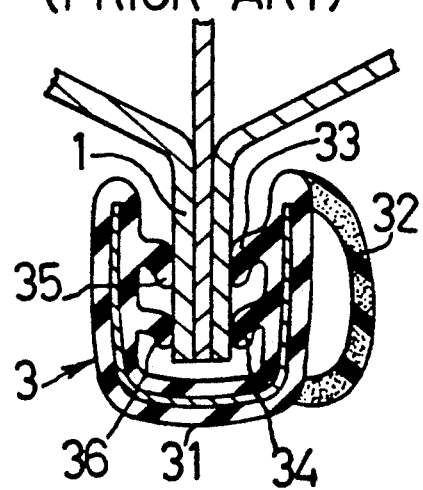

In the weather strip of the third embodiment, the respective retaining lips 35, 36 are connected to each other by a bridge 37. A notch 38 is longitudinally formed in the root portion of the retaining lip 35 while a notch 39 is also longitudinally formed at a connecting end of the bridge 37 to the retaining lip 36. These notches 38, 39 make both the root portion of the retaining lip 35 and the connecting end of the bridge 37 thin enough to be ripped off therealong. The bridge 37 extends in nearly parallel with the inner side surface of the trim portion 31 forming a parallelogram with the retaining lips 35, 36, and the inner side surface of the trim portion 31. The bridge 37 does not have to be parallel with the inner side surface of the trim portion 31 but may extend at a slight angle with respect to the inner side surface of the trim portion 31 as shown in FIG. 12.

The trim portion 31 is made of a rigid material such as solid rubber, while the sealing portion 32 is made of a soft deformable material such as sponge rubber. The weather strip 3 of the third embodiment is produced by extruding rubber materials and the metal core 4 integrally.

The obtained weather strip 3 is attached to flanges surrounding front and rear door opening of a motor vehicle. In order to attach the weather strip to the flange, for example, of a front door opening, the weather strip 3 is cut to have a predetermined length, and then the retaining lips 35 and the bridge 37 corresponding to the region A of FIG. 1 are ripped off along the notches 38 and 39. FIGS. 10 and 11 illustrate the attached state of the weather strip in the regions A and B, respectively. The attached state of a rear door opening is the same as that shown in FIG. 11.

As is apparent from the drawings, in the region A where the flange is composed of edges of two body panels and two reinforcing plates, the weather strip can be attached to such a thick flange 1 since the retaining lip 35 and the bridge 37 are ripped off. At the same time, as described-above, the thick flange 1 is securely held by the retaining lips 34 and 36 so that a large flange extraction load can be obtained.

In the other regions of the door openings, the retaining lips 35 and 36 which are connected to each other by the bridge 37, integrally operate to apply a resistance force against the flange 1 so that the weather strip exhibits a large flange extraction load in spite of the existance of notch 38 in the retaining lip 35. Accordingly, such slips of the weather strip as shown in FIG. 15 can be prevented when the weather strip of the present embodiment is attached along corner portions of a door opening or the like.

What is claimed is:

1. A weather strip to be attached to a flange formed along a door opening or a door frame of a motor vehicle, comprising:
    a trim portion having a U-shaped cross-section so as to include a pair of opposed inner wall surfaces;
    a sealing portion formed on an outer surface of said trim portion; and
    flange retaining lips projecting from said inner wall surfaces of said trim portion inwardly for holding the flange;
    said flange retaining lips being composed of at least one flange retaining lip projecting from one of said opposed inner wall surfaces of said trim portion, and at least two flange retaining lips projecting from the other one of said opposed inner wall surfaces;
    one of said at least two flange retaining lips, which projects from adjacent an open end of said trim portion having a base portion and a tip portion, said tip portion having a thickness equal to or less than a thickness of said base portion, said trim portion having a longitudinally extending notch defined solely in said base portion and along said base portion closely adjacent said inner wall surface so that at said notch said base portion is thin enough to be ripped off, whereby when the weather strip is attached to a relatively thick flange, said one of said at least two flange retaining lips will be ripped off along said longitudinally extending notch along the length of said relatively thick flange, and when the weather strip is attached to a flange having locally varying .hickness, said one of said at least two flange retaining lips will be ripped off along said longitudinally extending notch at portions corresponding to at least some thicker portions of the flange having locally varying thickness.

2. A weather strip according to claim 1, wherein said notch is longitudinally formed in an inner side of said root portion of said one of said at least two flange retaining lips, relative to said open end.

3. A weather strip according to claim 2, wherein opposed edges defining an opening of said notch are in contact with each other so as to close said opening of said notch.

4. A weather strip to be attached to a flange formed along a door opening or a door frame of a motor vehicle, comprising:
    a trim portion having a U-shaped cross-section so as to include a pair of opposed inner wall surfaces;
    a sealing portion formed on an outer surface of said trim portion;
    flange retaining lips projecting from said inner wall surfaces of said trim portion inwardly for holding the flange;
    said flange retaining lips being composed of at least one flange retaining lip projecting from one of said opposed inner wall surfaces of said trim portion, and at least two flange retaining lips projecting from the other one of said opposed inner wall surfaces;
    one of said at least two flange retaining lips, which projects from adjacent an open end of said trim portion having a longitudinally extending notch defined along a root portion thereof so that said root portion is thin enough to be ripped off; and
    a bridge for connecting said one of said at least two flange retaining lips to another one of said at least two flange retaining lips which is adjacent to said one of said at least two flange retaining lips, wherein a connecting end of said bridge to said another one of said at least two flange retaining lips is thin enough for said bridge to be ripped off along said connecting end.

5. A weather strip according to claim 4, wherein a notch is defined longitudinally of each of said one of said at least two flange retaining lips at a root portion thereof and said connecting end of said bridge such that said one of said at least two flange retaining lips and said connecting end are thin enough for said one of said at least two flange retaining lips and said bridge, respectively, to be ripped off said trim portion.

6. A weather strip to be attached to a flange formed along a door opening or a door frame of a motor vehicle, comprising:
    a trim portion having a U-shaped cross-section so as to include a pair of opposed inner wall surfaces;

a sealing portion formed on an outer surface of said trim portion; and flange retaining lips projecting from said inner wall surfaces of said trim portion inwardly for holding the flange;

said flange retaining lips being composed of at least one flange retaining lip projecting from one of said opposed inner wall surfaces of said trim portion, which is on the same side of said trim portion as said sealing portion, and at least two flange retaining lips projecting from the other one of said opposed inner wall surfaces, which is on the opposite side from said sealing portion;

one of said at least two flange retaining lips, which projects from adjacent an open end of said trim portion having a base portion and a tip portion, said tip portion having a thickness equal to or less than a thickness of said base portion, a notch being formed solely in the base portion of said one of said at least two flange retaining lips, said notch extending along said base portion closely adjacent said respective inner wall surface so that at said notch said base portion is thin enough to be ripped off, whereby when the weather strip is attached to a relatively thick flange, said one of said at least two flange retaining lips will be ripped off along said longitudinally extending notch along the length of said relatively thick flange, and when the weather strip is attached to a flange having locally varying thickness, said one of said at least two flange retaining lips will be ripped off along said longitudinally extending notch at portions corresponding to at least some thicker portions of the flange having locally varying thickness.

7. A weather strip to be attached to a flange formed along a door opening or a door frame of a motor vehicle, comprising:

a trim portion having a U-shaped cross-section so as to include a pair of opposed inner wall surfaces;

a sealing portion formed on an outer surface of said trim portion;

flange retaining lips projecting from said inner wall surfaces of said trim portion inwardly for holding the flange;

said flange retaining lips being composed of at least one flange retaining lip projecting from one of said opposed inner surfaces of said trim portion, which is on the same side of said trim portion as said sealing portion, and at least two flange retaining lips projecting from the other one of said opposed inner surfaces, which is on the opposite side of said trim portion from said sealing portion;

a bridge for connecting one of said at least two retaining lips, which projects from adjacent an open end of said trim portion, to another one of said at least two retaining lips, which is adjacent to said one of said at least two retaining lips;

a notch being formed in each of a root portion of said one of said at least two retaining lips, and a connecting end of said bridge to said another one of said at least two flange retaining lips.

* * * * *